(12) United States Patent
Arad et al.

(10) Patent No.: US 10,587,516 B1
(45) Date of Patent: Mar. 10, 2020

(54) HASH LOOKUP TABLE ENTRY MANAGEMENT IN A NETWORK DEVICE

(71) Applicant: Marvell Israel (M.I.S.L) Ltd., Yokneam (IL)

(72) Inventors: Carmi Arad, Nofit (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 254 days.

(21) Appl. No.: 14/800,478

(22) Filed: Jul. 15, 2015

Related U.S. Application Data

(60) Provisional application No. 62/042,593, filed on Aug. 27, 2014, provisional application No. 62/024,662, filed on Jul. 15, 2014.

(51) Int. Cl.
*H04L 12/743* (2013.01)
*G06F 16/242* (2019.01)
*G06F 16/2455* (2019.01)

(52) U.S. Cl.
CPC ........ *H04L 45/7453* (2013.01); *G06F 16/242* (2019.01); *G06F 16/2455* (2019.01)

(58) Field of Classification Search
CPC ... H04L 45/7453; H04L 45/74; H04L 45/745; H04L 12/5689; H04L 67/104; H04L 63/166; H04L 67/141; H04L 67/1065; H04L 67/14; H04L 29/12009; H04L 29/12207; H04L 61/20; H04L 63/08; H04L 67/1046; H04L 67/1057; H04L 67/1095; H04L 67/34; H04L 69/329; H04L 63/0442; H04L 63/105; H04L 63/164; G06F 17/30389; G06F 17/30477; G06F 17/30949; G06F 9/544; G06F 29/12009
USPC ................................................. 709/216, 219
See application file for complete search history.

(56) References Cited

U.S. PATENT DOCUMENTS

| | | | |
|---|---|---|---|
| 5,032,987 A * | 7/1991 | Broder | G06F 15/161 707/E17.036 |
| 6,035,107 A | 3/2000 | Kuehlmann et al. | |
| 6,249,521 B1 | 6/2001 | Kerstein | |
| 6,363,396 B1 | 3/2002 | Klots et al. | |
| 6,430,170 B1 | 8/2002 | Saints et al. | |
| 6,457,058 B1 * | 9/2002 | Ullum | H04L 12/467 709/238 |
| 6,614,758 B2 | 9/2003 | Wong et al. | |

(Continued)

OTHER PUBLICATIONS

U.S. Appl. No. 14/012,834, filed Aug. 28, 2013.

(Continued)

*Primary Examiner* — Tan Doan

(57) ABSTRACT

In a method for managing a network device a current hash value is determined for a current key to be inserted into a lookup table. The current hash value associated with a current set of memory locations in the lookup table, wherein the current set of memory locations includes a memory location corresponding to the current hash value and one or more other memory locations. In response to determining that each memory location in the current set of memory location is occupied, one or multiple previously stored keys in the lookup table are iteratively moved to other memory locations in the lookup table to free up a memory location in the current set of memory locations, the current key is inserted into the freed up memory location.

18 Claims, 5 Drawing Sheets

(56) References Cited

U.S. PATENT DOCUMENTS

| | | | |
|---|---|---|---|
| 6,735,670 B1 | 5/2004 | Bronstein et al. | |
| 6,973,082 B2 | 12/2005 | Devi et al. | |
| 7,190,696 B1 | 3/2007 | Manur et al. | |
| 7,280,527 B2 | 10/2007 | Basso et al. | |
| 7,346,706 B2 | 3/2008 | Rezaaifar et al. | |
| 7,539,750 B1 | 5/2009 | Parker et al. | |
| 7,554,914 B1 | 6/2009 | Li et al. | |
| 7,567,567 B2 | 7/2009 | Muller et al. | |
| 7,580,417 B2 | 8/2009 | Ervin et al. | |
| 7,613,209 B1 | 11/2009 | Nguyen et al. | |
| 7,623,455 B2 | 11/2009 | Hilla et al. | |
| 7,639,614 B2 | 12/2009 | Nakagawa et al. | |
| 7,796,594 B2 | 9/2010 | Melman et al. | |
| 7,821,925 B2 | 10/2010 | Davies | |
| 7,821,931 B2 | 10/2010 | Swenson et al. | |
| 7,827,182 B1* | 11/2010 | Panigrahy | G06F 17/30067 707/747 |
| 7,898,959 B1 | 3/2011 | Arad | |
| 7,969,880 B2 | 6/2011 | Yano et al. | |
| 7,979,671 B2 | 7/2011 | Aviles | |
| 8,238,250 B2 | 8/2012 | Fung | |
| 8,243,594 B1 | 8/2012 | Fotedar et al. | |
| 8,274,971 B2 | 9/2012 | Battle et al. | |
| 8,339,951 B2 | 12/2012 | Scaglione | |
| 8,355,328 B2 | 1/2013 | Matthews et al. | |
| 8,364,711 B2 | 1/2013 | Wilkins et al. | |
| 8,503,456 B2 | 8/2013 | Matthews et al. | |
| 8,587,674 B2 | 11/2013 | Iwata | |
| 8,614,950 B2* | 12/2013 | Roitshtein | H04L 47/125 370/229 |
| 8,625,594 B2 | 1/2014 | Safrai et al. | |
| 8,660,005 B2 | 2/2014 | Roitshtein et al. | |
| 8,756,424 B2 | 6/2014 | Roitshtein et al. | |
| 8,792,497 B2 | 7/2014 | Rajagopalan et al. | |
| 8,848,728 B1 | 9/2014 | Revah et al. | |
| 8,880,502 B2* | 11/2014 | Waldvogel | G06F 17/30545 707/713 |
| 2002/0093952 A1 | 7/2002 | Gonda | |
| 2002/0097724 A1* | 7/2002 | Halme | H04L 67/1002 370/392 |
| 2003/0210688 A1 | 11/2003 | Basso et al. | |
| 2004/0073640 A1 | 4/2004 | Martin et al. | |
| 2006/0251109 A1 | 11/2006 | Muller et al. | |
| 2007/0280258 A1 | 12/2007 | Rajagopalan et al. | |
| 2008/0031263 A1 | 2/2008 | Ervin et al. | |
| 2008/0037544 A1 | 2/2008 | Yano et al. | |
| 2008/0049774 A1 | 2/2008 | Swenson et al. | |
| 2008/0052488 A1 | 2/2008 | Fritz et al. | |
| 2008/0181103 A1 | 7/2008 | Davies | |
| 2008/0205655 A1 | 8/2008 | Wilkins et al. | |
| 2008/0228691 A1* | 9/2008 | Shavit | G06F 17/30949 |
| 2008/0229056 A1* | 9/2008 | Agarwal | G06F 17/30949 711/216 |
| 2009/0196303 A1 | 8/2009 | Battle et al. | |
| 2010/0023726 A1 | 1/2010 | Aviles | |
| 2011/0013627 A1 | 1/2011 | Matthews et al. | |
| 2011/0102612 A1 | 5/2011 | Iwata | |
| 2011/0134925 A1 | 6/2011 | Safrai et al. | |
| 2012/0016882 A1* | 1/2012 | Tofano | G06F 7/00 707/747 |
| 2012/0136846 A1* | 5/2012 | Song | H04L 45/7453 707/698 |
| 2012/0143877 A1* | 6/2012 | Kumar | G06F 17/30949 707/747 |
| 2013/0054217 A1* | 2/2013 | Gullapalli | G06F 17/5022 703/14 |
| 2013/0185537 A1* | 7/2013 | Abali | G06F 17/30097 711/216 |
| 2013/0266014 A1* | 10/2013 | Blomquist | H04L 45/7453 370/392 |
| 2014/0079064 A1* | 3/2014 | Angst | H04L 45/7453 370/392 |
| 2014/0115167 A1 | 4/2014 | Roitshtein et al. | |
| 2014/0142903 A1* | 5/2014 | Gullapalli | G06F 17/5022 703/2 |
| 2014/0160934 A1 | 6/2014 | Roitshtein et al. | |
| 2014/0223091 A1* | 8/2014 | Hughes | G11C 7/1072 711/105 |
| 2015/0039852 A1* | 2/2015 | Sen | G06F 17/3033 712/4 |
| 2015/0052309 A1* | 2/2015 | Philip | G06F 12/0864 711/128 |
| 2015/0370720 A1* | 12/2015 | Rowlands | G06F 12/0891 711/133 |
| 2016/0241475 A1* | 8/2016 | Wang | H04L 45/7453 |

OTHER PUBLICATIONS

U.S. Appl. No. 13/737,608, filed Jan. 9, 2013.
U.S. Appl. No. 61/695,520, "Efficient TCAM Architecture," filed Aug. 31, 2012 (Levi, et al.).
U.S. Appl. No. 13/115,670, "Methods and Apparatus for Handling Multicast Packets in an Audio Video Bridging (AVB) Network," filed May 25, 2011 (Pannell, et al.).
U.S. Appl. No. 12/537,078, "Hash Computation for Network Switches," filed Aug. 6, 2009 (Mizrahi, et al.).
Thaler et al., "Multipath Issues in Unicast and Multicast Next-Hop Selection," The Internet Society, pp. 1-10 (2000).
Shavit, Nir, "Hopscotch Hashing," PowerPoint Presentation downloaded from http://www.velox-project.eu/sites/default/files/Hopscotch%20Hashing%20talk%20slides.ppt on Oct. 6, 2014 (50 slides).
Raoof, K., Prayongpun, N., Impact of Depolarization Effects on MIMO Polarized Wireless Configuration, Wireless Communications, Networking and Mobile Computing, 2007. WiCom 2007, pp. 1-4 (Sep. 2007).
Peng et al., "Content-Addressable memory (CAM) and its network applications," International IC—Taipei Conference Proceedings, May 2000.
Pandiyan et al. "Hopscotch Hashing," *Wikipedia* entry downloaded from : <http://www.cs.nyu.edu/~lerner/spring11/proj_hopscotch.pdf> New York University,—8 pages.
Levi et al., U.S. Appl. No. 61/695,520, "Efficient TCAM Architecture," filed Aug. 31, 2012.
IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).
IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).
IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).
IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).
Herlihy, M., Shavit, N. and M. Tzafrir. Hopscotch Hashing. Proc. of the 22nd International Symposium on Distributed Computing (DISC 2008), pp. 350-364, Arcachon, France (Sep. 2008).
Demetriades et al., "An Efficient Hardware-based Multi-hash Scheme for High Speed IP Lookup," 2008 16th IEEE Symposium on High Performance Interconnects, Aug. 2008.
Arad et al., U.S. Appl. No. 13/737,608, "Exact Match Lookup in Network Switch Devices," filed Jan. 9, 2013.

\* cited by examiner

HASH LOOKUP TABLE ENTRY MANAGEMENT IN A NETWORK DEVICE

CROSS-REFERENCES TO RELATED APPLICATION

The present application claims the benefit of U.S. Provisional Application No. 62/024,662, filed on Jul. 15, 2014, and 62/042,593 filed on Aug. 27, 2014, both entitled "Insertion of Entries Into a Forwarding Database Using Hopscotch Hashing," the disclosures of which is hereby expressly incorporated herein by reference in their entireties.

FIELD OF TECHNOLOGY

The present disclosure relates generally to network devices, and more particularly, to hash lookup tables in network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, routers, edge devices and the like, perform exact-match lookups in database using keys that are derived from information associated with received packets received. Some such databases are implemented as hash tables. In such systems, a hash function is applied to a key to generate a hash value corresponding to the key, and the hash value is used to access the database in an attempt to locate the key in the database. If a match is found, information associated with the key, such as information indicative of a processing operation or an action to be performed on the packet, is retrieved from the database, and the information is used to further process the packet. However, such hash tables exhibit inherent collisions when a hash function generates a same hash value for two or more different keys provided to the hash function, and as a result, some keys provided to a hash table cannot be inserted into the hash table. As a result, some entries cannot be inserted into the hash table, resulting in loss of keys and, in at least some cases, low utilization of the hash table.

SUMMARY OF THE DISCLOSURE

In an embodiment, a method for managing a network device includes determining, by a hash value generator of the network device, a current hash value for a current key to be inserted into a lookup table, the current hash value associated with a current set of memory locations in the lookup table, wherein the current set of memory locations includes a memory location corresponding to the current hash value and one or more other memory locations. The method also includes determining, by a table entry manager of the network device, whether at least one of the memory locations in the current set of memory locations is not occupied by a previously stored key that is currently stored in the lookup table. The method additionally includes, in response to determining that each of the memory locations in the current set of memory location is occupied, iteratively moving, by the table entry manager, one or multiple previously stored keys in the lookup table to other memory locations in the lookup table to free up a memory location in the current set of memory locations, and inserting, by the table entry manager, the current key into the freed up memory location. The method additionally includes performing, by the network device, a lookup operation to locate in the lookup table an entry corresponding to a key, the key generated based on a network packet received at the network device.

In another embodiment, an apparatus for populating a lookup hash table in a network device comprises a hash value generator configured to generate a current hash value for a current key to be inserted into a lookup table, the current hash value associated with a current set of memory locations in the lookup table, wherein the current set of memory locations includes a memory location corresponding to the current hash value and one or more other memory locations. The apparatus further comprises a table entry manager configured to determine whether at least one of the memory locations in the current set of memory locations is not occupied by a previously stored key that is currently stored in the lookup table. The table entry manager is further configured to, in response to determining that each of the memory locations in the current set of memory location is occupied, iteratively move one or multiple previously stored keys in the lookup table to other memory locations in the lookup table to free up a memory location in the current set of memory locations, and insert the current key into the freed up memory location. The network device is configured to perform a lookup operation to locate a key in the lookup table, the key generated based on a network packet received at the network device.

DETAILED DESCRIPTION

Figure 1:
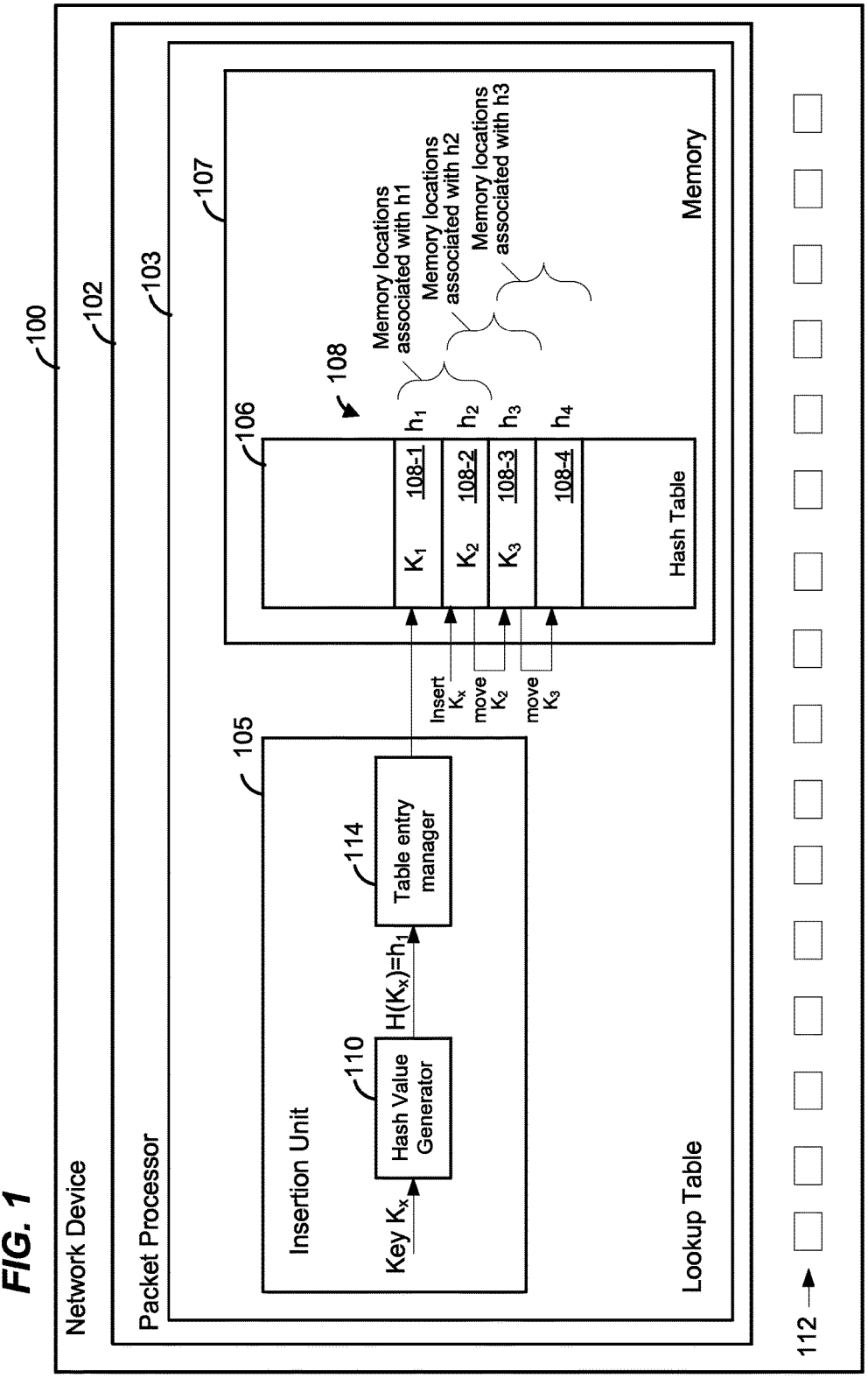
FIG. 1 is a simplified block diagram of an example network device configured to efficiently resolve collisions in populating a hash-based lookup table, according to an embodiment.

FIG. 1 is a simplified block diagram of an example network device 100 configured to efficiently resolve collisions when inserting new records into a hash-based lookup table, in accordance with an embodiment of the present disclosure. The network device 100 is generally a computer networking device that connects two or more computer systems, network segments, subnets, and so on. For example, the network device 100 is a router, in one embodiment. It is noted, however, that the switching device 100 is not necessarily limited to a particular protocol layer or to a particular networking technology (e.g., Ethernet). For instance, the network device 100 could also be a bridge, a VPN concentrator, etc.

The network device 100 includes a packet processor 102 coupled to a plurality of ports 112, and each of the ports 112 is coupled to a communication network (e.g., to a network device within a communication network) or to a final destination in the communication network. In general, the packet processor 102 is configured to process packets received via ingress ports 112, to determine respective egress ports 112 via which the packets should be transmitted, and to transmit the packets via the determined egress ports 112. In some embodiments, the packet processor 102 is configured to receive a packet at an ingress port 112, to store the packet in a memory, to perform processing of the packet while the packet is stored in the memory, to determine one or more egress ports 112 via which the packet should be transmitted, and, after making the forwarding decision, to retrieve the packet from the memory and transmit the packet via the one or more egress ports 112. In some embodiments, the packet processor 102 generates a packet descriptor for the packet, and the packet descriptor, rather than the packet itself, is subsequently processed by the packet processor 102. A packet descriptor includes some information from the packet, such as some or all of the header information of the packet, in an embodiment. In some embodiments, the packet descriptor additionally includes other information such as an indicator of where in the memory the packet is stored. In an embodiment, information in a packet descriptor corresponding to a packet, rather than the packet itself, is utilized to perform one or more processing operations on the packet that is stored in the memory. For ease of explanation, the term "packet" hereinafter is used to refer to a packet itself or to a packet descriptor associated with the packet.

The packet processor 102 includes a lookup table 103. In an embodiment, the packet processor 102 accesses the lookup table 103 using a key generated for a packet being processed by the packet processor 102, and retrieves information used in processing of the packet by the packet processor 102. For example, in an embodiment, the lookup table 103 is a forwarding database that stores, for example, associations between the ports 112 of the network device 100 and addresses (for instance, media access control (MAC) addresses, Internet Protocol (IP) addresses, VLANs, multicast addresses, etc.) of network device connected to the ports 112. In this embodiment, the packet processor 102 utilizes the lookup table 103 to determine or "look up" an egress port 112 to which a packet should be forwarded using the destination address contained in a header of the packet as the key, or another suitable key generated based on the destination address, to access the lookup table 103 and to retrieve indications of one or more ports 112 to which to forward the packet. As another example, in another embodiment, the lookup table 103 is a policy table that stores associations between a key and one or more policy control actions (e.g., with regard to access control, quality of service, flow measurements, VLAN assignments, etc). For example, in an embodiment in which the lookup table 103 is a policy table, the lookup table 103 provides a policy to be applied to a packet, for example to drop a packet, based on various characteristics such as source of the packet, a destination, a type of packet, a size of the packet and the like. In this embodiment, the packet processor 102 generates a key for a packet based on various fields in a header of the packet, and utilizes key access the lookup table 103 to lookup a policy action to be performed on the packet. In another embodiment, the lookup table 103 is a packet classification table that stores associations between header information, such as one or more fields in a header of a packet, and packet types corresponding to the packets. In other embodiments, the lookup table 103 stores other information generally used by the packet processor 102 to process packets received by the network device 100.

In an embodiment, a key can be stored in the lookup table 103 in one of a plurality of memory locations in a set of memory locations associated with a hash value generated for the key. The packet processor 102 is configured to utilize a suitable lookup technique to locate the key within a set of multiple memory locations associated with a hash value corresponding to the key, in such embodiments. Upon locating the key in the lookup table 103, the packet processor 102 retrieves, from the lookup table 103, information associated with the key and utilizes the information to further process the packet, for instance by performing an action on the packet. For example, the packet processor 102 uses the information to forward the packet to an appropriate port 112 for transmitting the packet towards its destination, to classify the packet, etc., in various embodiments.

The lookup table 103 includes an insertion unit 105, sometimes referred to insertion processor or insertion engine 105, coupled to a hash table 106 stored in a memory 107. In an embodiment, the insertion unit 105 is configured to populate and/or to update the hash table 106 by inserting new keys, and information associated with the new keys, into the hash table 106. As merely an example, in an embodiment in which the lookup table 102 is a forwarding database, the insertion unit 105 is configured to insert into the hash table 106 records that associate destination addresses and ports 112 via which the destination addresses can be reached, when such associations are learned by the network device 100.

The insertion unit 105 includes a hash value generator 110 and a table entry manager 114, sometimes referred to table entry management processor or table entry management engine 114. The hash value generator 110 is configured to apply a suitable hash function H to a key to be inserted into hash table 106 to generate a hash value corresponding to the key. The hash value corresponds to a particular entry or a particular memory location in the hash table 106, in an embodiment. In some situations, collisions between two or more keys may result when the hash function generates a same hash value for two or more keys. In such systems, some keys cannot be inserted into the hash table due to collisions between different keys that hash to same hash values, and some hash tables are, therefore, underutilized. This can result, for example, in the necessity of dropping one of the colliding keys, assigning a key to some other suboptimal location in the table that requires significant additional searching, expanding the size of the table so that fewer instances of collisions occur and the like. In an embodiment, the table entry manager 114 is configured to rearrange entries in the hash table 106, as described herein, to free up memory locations for inserting at least some colliding keys into the hash table 106, thereby increasing utilization of the hash table 106, in various embodiments. In other words, the techniques described herein facilitate inserting an increased number of keys into a hash lookup table of a given size as compared to the number of keys that can be inserted into the hash lookup table using conventional methods for inserting keys.

In an embodiment, the hash table 106 includes a plurality of entries 108 corresponding to respective hash values h. A hash value generated for a key by the hash value generator 110 is associated with a set of memory locations 108 in the hash table 106, the set of memory locations including (i) the memory location corresponding to the hash value generated for the key and (ii) one or more other memory locations in the hash table 106. In an embodiment, the one or more other memory locations in the hash table 106 correspond to one or more hash values different from the hash value generated for the key. The table entry manager 114 determines whether at least one memory location in the set of memory locations associated with the hash value generated for the key is not occupied by a previously inserted key that is currently stored in the hash table 106, in an embodiment. In response to determining that at least one memory location in the set of memory locations associated with the hash value generated for the key is not occupied by a previously inserted key stored in the hash table 106, the table entry manager 114 inserts the key into an unoccupied memory location in the set of memory locations associated with the hash value generated for the key. On the other hand, in response to determining that each memory location in the set of memory locations associated with the hash value generated for the key is occupied by a previously stored key in the hash table 106, the table entry management 114 moves one or more keys currently stored in the hash table 106 to other memory locations in the hash table 106 to free up a memory location in the set of memory locations associated with the hash value of the new key, as described herein, in various embodiments. In an embodiment, moving the one or more keys currently stored in the hash table 106 involves moving the one or more keys to respective memory locations in respective sets of memory locations associated with hash values corresponding to the one or more keys. In at least some situations, the table entry manager 114 iteratively moves one or multiple keys stored in the hash table 106 to new memory locations, respectively associated with hash values corresponding to the multiple moved keys, in order to free up a memory location for the new key being inserted into the hash table 106, as will be described in more detail below, in an embodiment. The table entry manager 114 then inserts the new key into the hash table 106 at the memory location freed up by moving the one or more previously stored keys, in an embodiment.

As referred to herein, the term "key" is sometimes used to refer to a key as well as information associated with the key. For example, "inserting a key," "storing a key," "moving a key," etc., as used herein is sometimes used to mean inserting (or storing, moving, etc.) a table entry or record that includes a key and information associated with the key. For example, in an embodiment, a hash function is applied to a key to obtain a hash value for the key, and, using the hash value generated for the key, a record is inserted into the hash table 106, wherein the record includes the key and information associated with the key. Similarly, in a lookup operation, a hash function is applied to a key, and a record is retrieved from the hash table 106 using the hash value generated for the key, wherein the record includes a key and information associated with the key. If the key in the retrieved record matches that key that was hashed to retrieve the record, then the information in the retrieved record is utilized for processing of the packet associated with the key, in an embodiment.

In an embodiment, the packet processor 102 is implemented using a suitable combination of hardware, firmware and/or software components. As merely an example, lookup operations (e.g., search operations) in the lookup table 103 are performed utilizing hardware or a processor executing firmware instructions stored in a computer readable memory (not shown), while update operations, such as key insertions and/or deletions, in the lookup table 103 are performed by a processor executing software instructions stored in a computer-readable memory (not shown), in an embodiment.

With continued reference to FIG. 1, in the illustrated embodiment, the hash value generator 110 applies the hash function H to a new key $K_x$ to be inserted into the hash table 106, and generates a hash value $h_1$ corresponding to the key. The hash value $h_1$ corresponds to a memory location 108-1 and is associated with a set of memory locations that includes the memory location 108-1 corresponding to the hash value $h_1$ and a memory location 108-2 corresponding to a hash value $h_2$, in an embodiment. The memory locations 108-1 and 108-2 in the set of memory locations associated with the hash value h1 are occupied by keys that were previously stored in the hash table 106, in the illustrated embodiment. In particular, the memory location 108-1 is occupied by a key $K_1$ previously inserted into the hash table 106, and the memory location 108-2 is occupied by a key $K_2$ previously inserted the hash table 106, in the illustrated embodiment. Although the memory locations 108-1 and 108-2 in the set of memory locations associated with the hash value h1 are shown in FIG. 1 as consecutive memory locations in the hash table 106, this need not be the case, and the set of memory locations associated with the hash value h1 are non-consecutive memory locations in the hash table 106 in some embodiments.

In response to determining that each memory location 108 in the set of memory locations associated with the hash value $h_1$ is occupied by a previously stored key in the hash table 106, the table entry management 114 moves one or more keys currently stored in the hash table 106 to free up a memory location in the set of memory locations associated with the hash value $h_1$. For example, in the illustrated embodiment, the table entry management 114 moves a key $K_3$ from the memory location 108-3 to the memory location 108-4 to free up a memory location in a set of memory locations associated with a hash value corresponding to the key $K_2$. In an embodiment, the table entry management 114 moves the key $K_3$ to the memory location 108-4 because the memory location 108-4 (i) is not currently occupied by a previously stored key and (ii) is within a set of memory locations associated with a hash value corresponding to the key $K_3$. The table entry management 114 then moves the key $K_2$ to the freed up memory location 108-3, in turn freeing up the memory location 108-2 in the set of memory locations associated with the hash value $h_1$ corresponding to the key $K_x$. The table entry management 114 then inserts the new key $K_x$ into the hash table 106 at the freed up memory location 108-2. Accordingly, by moving the keys $K_2$ and $K_3$ to other memory locations in the hash table 106, the table entry management 114 avoids an insertion failure due to collision of the key $K_x$ with the keys $K_1$ and $K_2$ previously stored at the memory locations in the set of memory locations associated with the hash value $h_1$ corresponding to the key $K_x$, in an embodiment.

In an embodiment, the packet processor 102 is configured to use a suitable lookup technique to locate, in the hash table 106, a key generated based on a packet received at a port 112 of the network device 100. For example, in an embodiment, the hash value generator 110, or another hash value generator, is configured to apply the hash function H to a key generated based on a packet (e.g., based on information in a header of the packet) received at a port 112 of the network device 100 to generate a hash value for the key. The packet processor 102 is configured to sequentially or in parallel check the multiple memory locations in the set of memory locations associated with the hash value generated for the key in an attempt to locate the key in one of the multiple memory locations, in an embodiment. In another embodiment, the packet processor 102 is configured to generate multiple hash values for the key, and to use the multiple hash values to determine which of the multiple memory locations should be checked in an attempt to locate the key. Some example lookup techniques used by the packet processor 102 in some embodiments are described in U.S. patent application Ser. No. 14/012,834, filed on Aug. 28, 2013, and entitled "Exact Match Hash Lookup Databases in Network Switch Devices," which is hereby incorporated by reference herein, in its entirety.

Figure 2B:
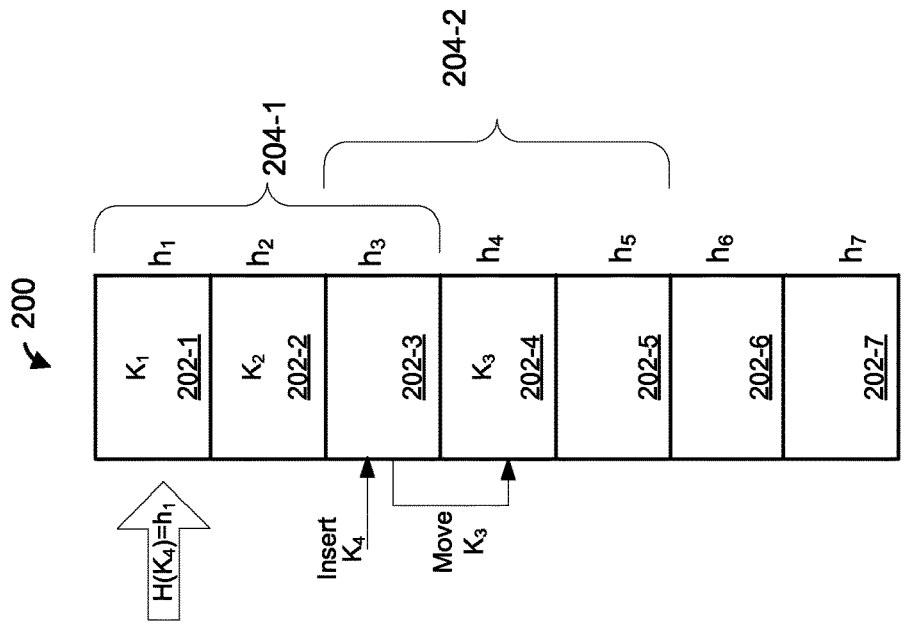
FIGS. 2A-2B illustrates an example hash table and an example technique for resolving collisions in populating the example hash table, according to an embodiment.
Figure 2A:
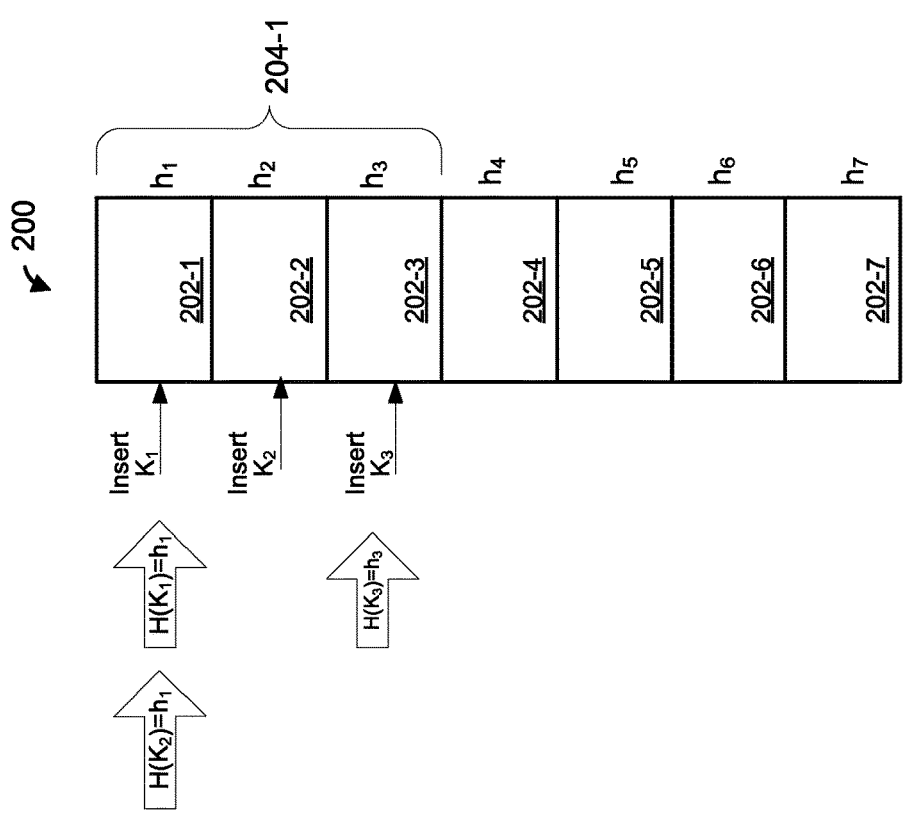

FIGS. 2A-2B illustrate an example hash table 200 and an example technique for resolving collisions in the hash table 200, according to an embodiment. The hash table 200 is used with the network device 100 of FIG. 1, in an embodiment. For example, the hash table 200 corresponds to the hash table 106 of the network device 100 of FIG. 1, in an embodiment. In another embodiment, the hash table 200 is used with a suitable network device different from the network device 100 of FIG. 1. Similarly, the network device 100 of FIG. 1 uses a hash table different from the hash table 200, in an embodiment. For ease of explanation, management of the hash table 200, according to some example embodiments, is described below in connection with the network device 100 of FIG. 1.

The hash table 200 comprises a plurality of memory locations 202, each memory location 202 corresponding to a respective hash value $h_1$-$h_7$. In particular, the hash table 200 includes seven memory locations including an initial memory location 202-1 and a last memory location 202-7, in the illustrated embodiment. Although the hash table 200 is illustrated as having seven memory locations, the hash table 200 includes other suitable numbers (e.g., 2, 3, 4, 5, 6, 8, 9, 10, etc.) of memory locations in other embodiments. In an embodiment, each hash value is associated with a set of memory locations 202 in the hash table 200, the set of memory locations including the memory location 202 corresponding to the hash value and one or more other memory locations corresponding to one or more other hash values. For example, in an embodiment, a set of memory locations 202 associated with a particular hash value $h_1$-$h_7$ includes (i) the memory location 202 that corresponds to the particular hash value $h_1$-$h_7$ and (ii) one or more consecutive memory locations, corresponding to one or more other consecutive hash values, adjacent to (e.g., immediately following or immediately preceding) the memory location corresponding to the particular hash value $h_1$-$h_7$. In another embodiment, the set of memory locations associated with a particular hash value includes a suitable set of non-consecutive memory locations in the hash table 200, wherein the specific memory locations are determined based on the particular hash value associated with the set of non-consecutive memory locations.

Referring first to FIG. 2A, the hash table 200 is initially empty, in the illustrated embodiment. A first key $K_1$ to be inserted into the hash table 200 hashes to a hash value $h_1$ corresponding to the memory location 202-1. The hash value $h_1$ is associated with a set of memory locations 202, in an embodiment. For example, the hash value $h_1$ is associated with a set of memory locations including the memory location 202-1, the memory location 202-2 and the memory location 202-3, in an embodiment. Because the memory location 202-1 corresponding to the hash value $h_1$ is empty, the table entry manager 114 inserts the key $K_1$ into the memory location 202-1. A second key $K_2$ to be inserted into the hash table 200 also hashes to the hash value $h_1$ associated with the set 204-1 of memory locations 202. The table entry manager 114 checks the memory location 202-1 corresponding to the hash value $h_1$ and determines that the memory location 202-1 is occupied. In response to determining that the memory location 202-1 is occupied, the table entry manager t 114 checks a next memory location in the set 204-1, in an embodiment. For example, the table entry manager 114 checks the memory location 202-2 and, in response to determining that the memory location 202-2 is empty, inserts the key $K_2$ into the memory location 202-2. Although the next memory location in the set 204-1 (i.e., the memory location 202-2) is illustrated in FIG. 2A as being adjacent to the memory location 204-1, the set 204-2 includes non-adjacent memory locations in the hash table 200 in another embodiment. In this embodiment, in response to determining that the memory location 202-1 is occupied, the table entry manager 114 checks a memory location that is not adjacent to the memory location 202-1.

Continuing with the embodiment illustrated in FIG. 2A, a third key $K_3$ to be inserted into the hash table 200 hashes to a hash value $h_3$ corresponding to the memory location 202-3. Because the memory location 202-3 is empty, the table entry manager 114 inserts the key $K_3$ into the memory location 202-3, in the illustrated embodiment.

Referring now to FIG. 2B, a fourth key $K_4$ to be inserted into the hash table 200 hashes to the hash value $h_1$ corresponding to the memory location 202-1. All memory locations 202 in the set 204-1 associated with the hash value $h_1$ are already occupied by keys $K_1$, $K_2$, $K_3$ previously inserted into the hash table 200, in the illustrated embodiment. In an embodiment, in response to determining that all of the memory locations 202 in the set 204-1 are occupied, the table entry manager 114 selects one of the keys $K_1$, $K_2$, $K_3$ currently stored in the memory locations 202 in the set 204-1, and attempts to move the selected key to another memory location associated with the selected key. In an embodiment, the table entry manager 114 selects a key, among the keys currently stored at memory locations in the set 204-1, with a highest number of remaining possible memory locations for storing the key in the hash table 200. As an example, let $S_k$ be the set of possible memory locations for inserting a key K (i.e., the set of memory locations associated with a hash value or plurality of hash values corresponding to the key K), and let Ko be a key currently stored in a memory location in the set $S_k$. Further, let $S_{ko}$ be the set of memory possible memory locations for storing the key Ko (i.e., the set of memory locations associated with a hash value or plurality of hash values corresponding to the key Ko). In this example, the remaining possible memory locations for storing the key Ko is $S_{ko} \backslash S_k$, wherein $S_{ko} \backslash S_k$ is the set of memory locations included in the set $S_{ko}$ excluding the memory locations that are also in the set $S_k$. The number of remaining possible memory locations for the key Ko is the number of memory locations in the set $S_{ko} \backslash S_k$, in an embodiment. Accordingly, continuing with the above example, in an embodiment, the table entry manager 114 selects, among multiple candidate keys currently stored at memory locations in the set of memory locations associated with the hash value $h_1$ corresponding to the key K, a key Ko that has a maximum, or highest, number of memory location in the set $S_{ko} \backslash S_k$ among the candidate keys, in an embodiment. Selecting a key with a maximum, or a highest, number of remaining possible memory locations for storing the key in the hash table 200 generally decreases insertion failures in the hash table 200 and increases memory load utilization of the hash table 200, it at least some embodiments. In other embodiments, however, the table entry manager 114 uses other suitable selection criteria for selecting a key. For example, the table entry manager 114 randomly selects a key among the keys currently stored at memory locations in the set 204-1, and attempts to move the randomly selected key, in an embodiment.

In the example scenario illustrated in FIG. 2B, the table entry manager 114 selects the key $K_3$ stored at the memory location 202-3. The key $K_3$ originally hashed to the hash value $h_3$. The hash value $h_3$ is associated with a set 204-2 of memory locations 202 including the memory locations 202-3, 202-4, 202-5, with the memory locations 204-4 and 204-5 currently unoccupied, in the illustrated scenario. In response to determining that the memory location 204-4 is currently unoccupied, the table entry manager 114 moves the key $K_3$ to the memory location 202-4 in the set 204-2, thereby freeing up the memory location 202-3 in the set 204-1. The table entry manager 114 then inserts the key $K_4$ into the freed up memory location 202-3 in the set 204-1, in an embodiment.

Figures 3A, 3B:
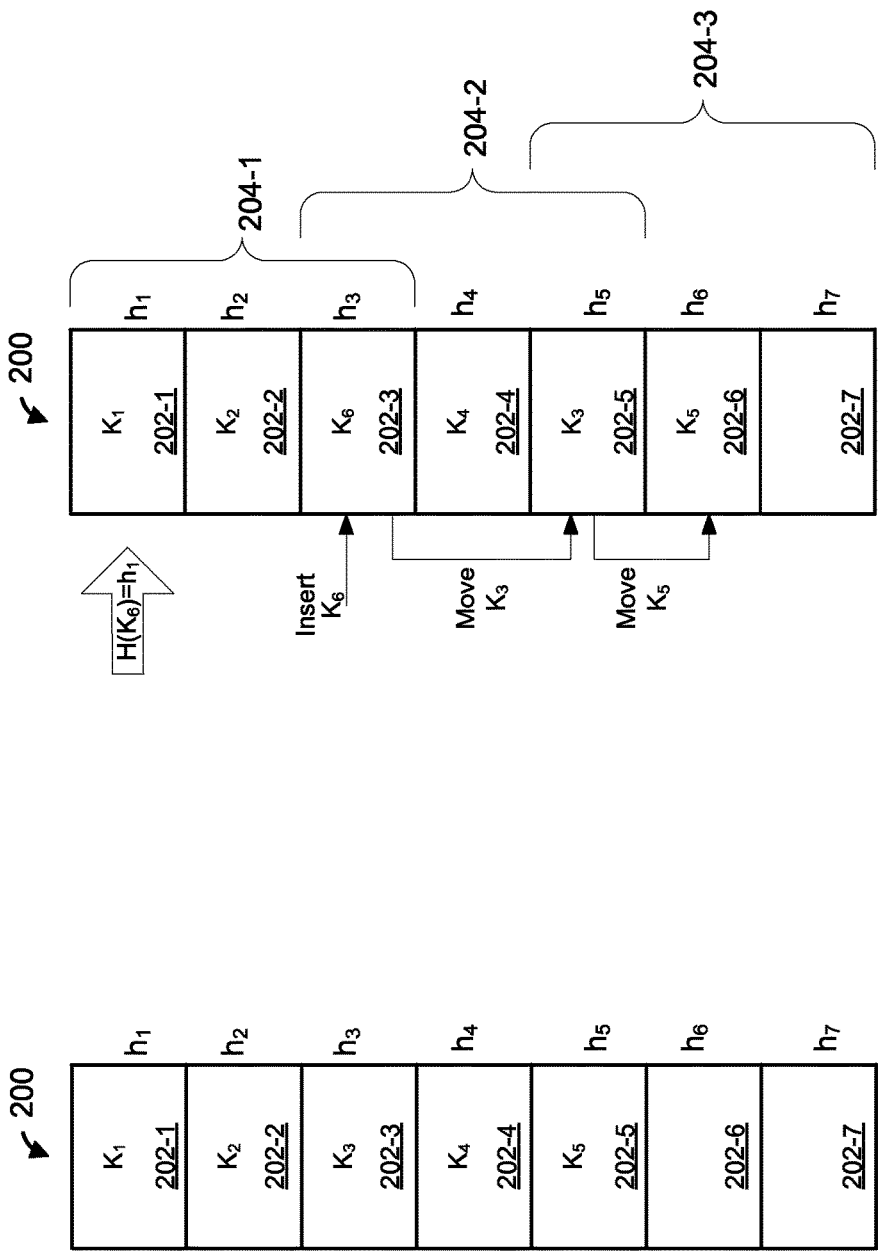
FIGS. 3A-3B illustrates another example technique for resolving collisions in populating the example hash table of FIGS. 2A-2B, according to an embodiment.

FIGS. 3A-3B illustrate another example technique for resolving collisions in the hash table 200, according to an embodiment. Referring to FIG. 3A, memory locations 202-1-202-5 are occupied by keys $K_1$-$K_5$. Referring now to FIG. 3B, a key $K_6$ hashes to the hash value $h_1$ corresponding to the memory location 202-1. Because all memory locations in the set 204-1 associated with the hash value $h_1$ are occupied by other keys, the table entry manager 114 selects a key stored at a memory location in the set 204-1 and attempts to move the selected key to another memory location in a set of memory locations associated with the selected key.

Referring still to FIG. 3B, in the illustrated embodiment, the table entry manager 114 selects the key $K_3$ stored at the memory location 202-3, and attempts to move the key $K_3$ to another memory location in a set 204-2 of memory locations associated with the hash value of the key $K_3$. However, all memory locations in the set 204-2 of memory locations are occupied by other keys, in the illustrated embodiment. In an embodiment, in response to determining that all memory locations in the set 204-2 are occupied, the table entry manager 114 selects a key stored in one of the memory locations in the set 204-2, and attempts to move the selected key to another memory location associated with a hash value of the selected key. For example, the table entry manager 114 selects the key $K_5$ stored at the memory location 202-5, and attempts to move the key $K_5$ to another memory location in a set of memory locations 204-3 associated with the hash value of the key $K_5$. The table entry manager 114 determines that a memory location 202-6 in the set 204-3 is not occupied by another key. The table entry manager 114 then moves the key $K_5$ to the memory location 202-6, thereby freeing up the memory location 202-5, and moves the key $K_3$ to the freed up memory location 202-5. Moving the key $K_3$ to the memory location 202-5, in turn, frees up the memory location 202-3 in the set 204-1 associated with the hash value $h_1$ of the key $K_6$. Accordingly, the table entry manager 114 inserts the key $K_6$ into the hash table 200 at the freed up memory location 202-3.

In an embodiment, each time the table entry manager 114 selects a key, currently stored at a memory location in the hash table 200, the table entry manager 114 selects a key with a highest number of remaining possible memory locations for storing the key in the lookup hash table. In other words, the table entry manager 114 selects a key that is currently stored at a memory location closest to the memory location that corresponds to the hash value of the key, in an embodiment. Selecting a key with a highest number of remaining possible memory locations for storing the key in the lookup hash table generally decreases insertion failures in the hash table 200 and increases memory load utilization of the hash table 200, it at least some embodiments. In other embodiments, however, the table entry manager 114 uses other suitable selection criteria for selecting a key. For example, the table entry manager 114 randomly selects a key, and attempts to move the randomly selected key, in an embodiment.

In the embodiment of FIGS. 3A-3B, the table entry manager 114 performs two iterations moving keys stored in the hash table 200 to other memory locations in the hash table 200 in order to free up a memory location for inserting a new key into the hash table 200. In other embodiments and/or scenarios, the table entry manager 114 performs other suitable numbers (e.g., 0, 1, 3, 4, 5, etc.) of iterations moving keys stored in the hash table 200 to other memory locations in the hash table 200 in order to free up a memory location for inserting a new key into the hash table 200. In an embodiment, the table entry manager 114 is configured to perform multiple iterations of moving keys stored in the hash table 200 to other memory locations in the hash table 200 until a memory location for the new key to be inserted is freed up or all possibilities for freeing up a memory location for the new key are exhausted and it is determined that a memory location for inserting the new key cannot be freed up. In another embodiment, the number of iterations performed by the table entry manager 114 is limited by a maximum number of iterations. In an embodiment, the maximum number of iterations to be performed in configurable by a user of the network device 100.

Referring to FIGS. 2A-2B and 3A-3B, in some embodiments, to select a key to be moved during an iteration of selecting a previously stored key and moving the selected previously stored key, table entry manager 114 select a key with a higher remaining number of memory locations for storing the key in the hash table based on the hash values corresponding to the candidate previously stored keys and the current memory locations of the candidate previously stored keys. In an embodiment, the table entry manager 114 calculates hash values of the candidate previously stored keys by applying the hash function H to the candidate previously stored keys. In another embodiment, the memory device 100 includes a suitable memory (not shown) for storing hash values of the keys current stored in the hash table 200. In this embodiment, the table entry manager 114 is configured to select the key using the stored hash values corresponding to the candidate keys, in an embodiment.

In an embodiment, the possible locations of a key are obtained by hashing the key. In one embodiment, the possible memory locations for storing the key are sequential, for example $H(K)$, $H(K)+1$, $H(K)+2$, etc, In general, however, the possible memory locations for storing the key need not be sequential. For example, n locations can addressed using n hash functions: $H_1(K), \ldots, H_n(K)$, in an embodiment. In an embodiment, the number n, i.e., the number of possible locations for storing a key, is a system global parameter that represent the service rate of the lookup table. For example, a lookup table having a service rate R access/sec can perform R/n lookups per second because in worst case the table has to be accessed n times per lookup, in an embodiment.

In an embodiment, the table entry manager 114 is configured to operate on a set of memory locations that wraps around from the last memory location 202-7 to the initial memory location 202-1. For example, referring to FIGS. 2A-2B and 3A-3B, a set of memory locations associated with the hash value $h_6$ includes the memory location 202-6, the memory location 202-7 and the memory location 202-1, in an embodiment. Similarly, a set of memory locations associated with the hash value $h_7$ includes the memory location 202-7, the memory location 202-1 and the memory location 202-2, in an embodiment. Accordingly, in such embodiments, an iteration of moving a previously stored key in the hash table 200 includes moving a key to a memory location in a set of memory locations that includes a last memory location in the hash table and an initial memory location in the hash table. Thus, for example, when attempting to move a key to a set of memory locations that includes both the last memory location 202-7 and the first memory location 202-1, the table entry manager 114 checks occupancy of the first memory location 202-1 after determining that the last memory location 202-7 is occupied, in an embodiment.

Referring still to FIGS. 2A-2B and 3A-3B, the hash table 200 is an n-way associative hash table that includes a plurality of memory locations, or "buckets," associated with each of the hash values $h_1$-$h_7$, wherein n is a suitable positive integer greater than one (e.g, 2, 3, 4, 5, etc.), in some embodiments. In such embodiments, a key that hashes to a particular hash value $h_1$-$h_7$ can be stored in any one of the buckets corresponding to the particular hash value $h_1$-$h_7$. For example, each entry 203 of the hash table 200 includes multiple memory locations that can store different keys that hash to the hash value corresponding entry 202, in an embodiment. In such embodiments, when determining whether at least one memory location in a set of memory locations associated with a hash value h is not occupied by a previously stored key that is currently stored in the hash table 200, table entry manager 114 checks multiple buckets in each entry included in the set of memory locations associated with the hash value h. In response to determining that each bucket in each entry included in the set of memory locations is occupied by some previously stored key, the table entry manager 114 performs one or more iterations of selecting a stored keys and moving the selected previously stored key to any bucket in a set of memory locations associated with the hash value of the selected previously stored key, using the techniques described above with respect to a one-way associative hash table, in an embodiment.

Figure 4:
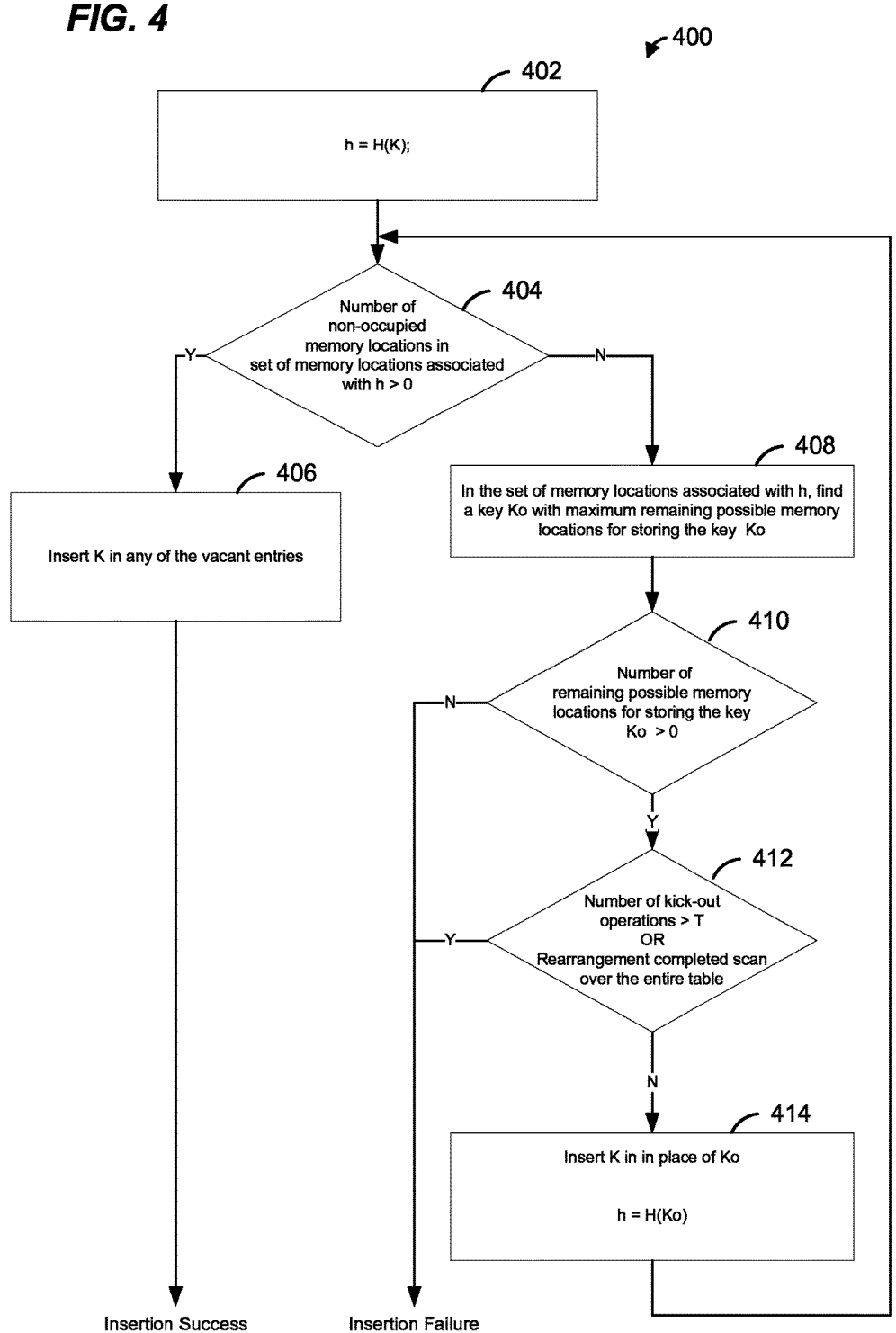
FIG. 4 is a flow diagram of an example method for inserting a key into a hash table, according to an embodiment.

FIG. 4 is a flow diagram of an example method 400 for inserting a key into a hash table, according to an embodiment. In an embodiment, the method 400 is implemented by the network device 100 of FIG. 1. For example, the method 400 is implemented at least partially by the insertion unit 105 of FIG. 1, in an embodiment. In other embodiments, the method 400 is implemented at least partially by other suitable components of the network device 100 or is implemented by another suitable network device.

At block 402, a hash value h is determined for a key K to be inserted into the hash table is determined. In an embodiment, the hash value h is associated with a set of memory locations in the hash table. At block 404, it is determined whether the number of non-occupied memory locations in the set of memory locations associated with the value h is greater than 0. If it is determined at block 404 that the number of memory locations in the set of memory locations associated with the value h is greater than 0, then the method proceeds to block 406. At block 406, the key K is inserted into the hash table at one of the non-occupied memory locations in the set of memory locations associated with the hash value h. For example, in an embodiment, consecutive the memory locations in the set of memory locations are sequentially searched, and the key K is inserted into a first memory location in the set that is determined to be empty or non-occupied, in an embodiment. As another example, in another embodiment, a non-occupied memory location among one or more non-occupied memory locations in the set is randomly selected, and the key K is inserted at the randomly selected non-occupied memory location. In another embodiment, a non-occupied memory location, in the set of memory locations, for inserting the key is determined in another suitable manner. In some embodiments, block 406 also includes storing the hash value h corresponding to the inserted key in a memory, such that the hash value can subsequently be retrieved (and not recalculated) if the inserted key is to be moved to another locations, as described in more detail below with respect to block 414.

Returning to block 404, if it is determined that the number of non-occupied memory locations in the set of memory locations associated with the value h is not greater than 0 (i.e., the number of non-occupied memory locations in the set of memory locations associated with the value h is equal to 0, the method proceeds to block 408. At block 408, a key Ko currently stored at one of the memory locations in the set of memory locations associated with the hash value h is selected. For example, in an embodiment, a key Ko with the highest number of remaining possible memory locations for Ko is selected (e.g., the highest number of elements in the set $S_{ko} \setminus S_k$). In another embodiment, a key Ko currently stored at one of the memory locations in the set of memory locations associated with the hash value h is selected according to another suitable selection criteria.

At block 410, it is determined whether the number of remaining memory locations for Ko is greater than zero. If it is determined at block 410 that the number of remaining memory locations for $K_0$ is not greater than zero (i.e., if the number of remaining memory locations for Ko can is equal to zero), this means that the key K cannot be inserted into the hash table because the key Ko cannot be moved to a new memory location in the hash table, in an embodiment. Accordingly, in this case, an insertion failure for the key K is declared, in an embodiment. On the other hand, if it is determined at block 410 that the number of remaining memory locations for Ko is greater than zero, then the method proceeds to block 412.

At block 412, it is determined whether the number of keys previously relocated to new memory locations in the process of inserting the new key K into the hash table exceeds a predetermined threshold and/or whether the entire hash table has been covered, in an embodiment. If it is determined at block 412 that the number of keys previously relocated to new memory locations in the process of inserting the new key K into the hash table exceeds the predetermined threshold and/or that the entire hash table has been covered, this means that the key K cannot be inserted into the hash table. Accordingly, in this case, an insertion failure for the key K is declared, in an embodiment. On the other hand, if it is determined at block 412 that the number of keys previously relocated keys in the process of inserting the new key K into the hash table does not exceed the predetermined threshold and/or that the entire hash table has not yet been covered, then the method proceeds to block 414.

At block 414, the key K is inserted into the memory location at which the key Ko selected at block 408 was stored in the hash table. Also at block 414, the hash value h is set to a hash value corresponding to the key Ko. For example, the hash value corresponding to the key Ko is generated at block 414 by applying the hash function H to the key Ko, in an embodiment. In another embodiment, the hash value corresponding to the key Ko is retrieved from a memory at block 414. For example, the hash value corresponding to the key Ko was stored in a memory when the key Ko was initially inserted into the hash table, in an embodiment. In this embodiment, the stored hash value corresponding to the key Ko is retrieved from the memory at block 414, and the hash value h is set to the retrieved hash value corresponding to the key Ko. The method then return to block 404 and an additional iteration is performed in an attempt to insert the key Ko into the hash table, in an embodiment.

Figure 5:
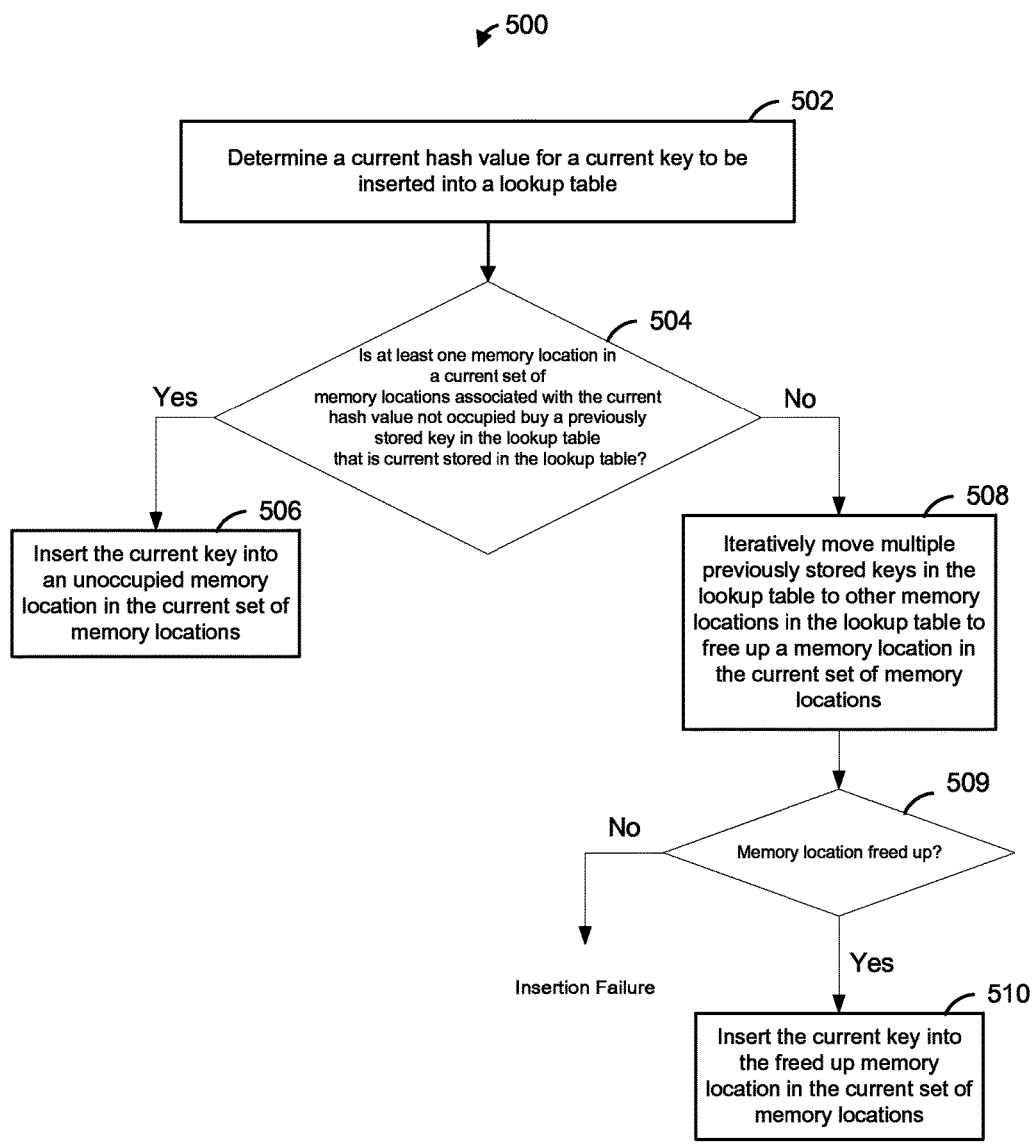
FIG. 5 is a flow diagram of an example method for managing a network device that includes a hash-based lookup table, according to an embodiment.

FIG. 5 is a flow diagram of an example method 500 for managing a hash table in a network device, according to an embodiment. In an embodiment, the method 500 is implemented by the network device 100 of FIG. 1. For example, the method 500 is implemented at least partially by the insertion unit 105 of FIG. 1, in an embodiment. In other embodiments, the method 500 is implemented at least partially by other suitable components of the network device 100 or is implemented by another suitable network device.

At block 502, a current hash value for a current key to be inserted into a hash table is determined. In an embodiment, the current key is to be inserted into the hash table is the hash table 106 of FIG. 1. In an embodiment, the current key is to be inserted into the hash table 200 of FIGS. 2A-2B and 3A-3B. In other embodiments, the current key is to be inserted into a suitable hash table different from the hash table 106 or the hash table 200. In an embodiment, the current hash value generated at block 502 is associated with a set of memory locations in the hash table. In an embodiment, the set of memory locations in the hash table includes a memory location corresponding to the current hash value generated for the key at block 502 and one or more other memory locations in the hash table. In an embodiment, the one or more other memory locations in the set of memory locations correspond to one or more hash values different from the hash value generated at block 502.

At block 504, it is determined whether at least one memory location in the current set of memory locations is not occupied by a previously stored key that is currently stored in the hash table. If it is determined at block 504 that at least one memory location in the current set of memory locations is not occupied by a previously stored key that is currently stored in the hash table, the method proceeds to block 506. At block 506, the current key is inserted into the hash table at an un-occupied memory location in the current set of memory locations.

On the other hand, if it determined at block 504 that each memory location in the current set of memory locations is occupied by some previously stored key that is currently stored in the hash table, the method proceeds to block 508. Block 508 attempts to iteratively move one or multiple previously stored key in the hash table to other memory locations in the hash table to free up a memory location in the current set of memory locations. In an embodiment, block 509 determines, according to suitable criteria (for example if the number of relocated keys would not exceed a predetermined threshold or if the entire hash table has been covered, as discussed above with respect to FIG. 4), whether the attempt at block 508 to move one or multiple previously stored keys in hash table to new memory locations successfully frees up a memory location for the current key. Block 509 is included in block 508, and is implemented in each iteration performed at block 508, in an embodiment. If the attempt at block 508 is successful, then the current key is inserted into the hash table, at block 510, at the freed up memory location, in the current set of memory locations, in an embodiment. On the other hand, if the attempt at block 508 to free up a memory location is not successful, then an insertion failure for the current key is declared, in an embodiment.

In an embodiment, the method further includes performing a lookup operation in the hash table using a key generated based on a packet received by the network device in order to determine a processing operation to be performed with respect to the packet by the network device or to retrieve other information relevant to processing of the packet by the network device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for operating a network device, the method comprising:

determining, by a hash value generator of the network device, a single current hash value for a current key to be inserted into a lookup table, the single current hash value, determined for the current key, indicating a current set of memory locations, in the lookup table, for potential insertion of the current key, wherein the current set of memory locations includes (i) a memory location hashed to by the single current hash value determined for the current key and (ii) one or more other memory locations, wherein respective ones of the one or more other memory locations are hashed to by respective ones of one or more other hash values, different from the current hash value, not determined for the current key;

determining, by a table entry manager of the network device, that each of the memory locations in the current set of memory locations is occupied by a previously stored key that is currently stored in the lookup table;

in response to determining that each of the memory locations in the current set of memory locations is occupied
iteratively moving, by the table entry manager, multiple previously stored keys in the lookup table to other memory locations in the lookup table to free up a memory location in the current set of memory locations, and
inserting, by the table entry manager, the current key into the freed up memory location in the current set of memory locations; and performing, by the network device, a lookup operation to locate in the lookup table an entry corresponding to a key, the key generated based on a network packet received at the network device.

2. The method of claim 1, wherein iteratively moving multiple previously stored keys includes selecting, in each of multiple iterations, a key among multiple candidate keys to be moved during the iteration.

3. The method of claim 2, wherein selecting the key to be moved during an iteration comprises selecting a key, among the multiple candidate keys, with a highest number of remaining possible memory locations for the key in the lookup hash table.

4. The method of claim 3, further comprising
storing, in a memory of the network device, hash values corresponding to keys stored in the lookup table, and
selecting the key to be moved during the iteration based on (i) the stored hash value corresponding to the key and (ii) the memory location at which the previously stored key is currently stored in the lookup table.

5. The method of claim 1, wherein moving a previously stored key during an iteration comprises moving the previously stored key to a memory location in a set of memory locations associated with a hash value corresponding to the previously stored key.

6. The method of claim 1, wherein the current set of memory locations further includes multiple memory locations corresponding to the current hash value, and wherein determining whether the current key can be inserted into the lookup hash table includes determining whether the current key can be inserted at any of the multiple memory locations corresponding to the current hash value.

7. The method of claim 1, wherein iteratively moving multiple previously stored keys includes moving a key to a memory location in a set of memory locations that includes a last memory location in the lookup table and an initial memory location in the lookup table.

8. The method of claim 1, wherein the current set of memory locations includes a plurality of consecutive memory locations in the lookup table.

9. The method of claim 1, wherein the current set of memory locations includes at least some non-consecutive memory locations in the lookup table.

10. A network device, comprising:
a hash value generator implemented on one or more integrated circuit devices, the hash value generator configured to determine a single current hash value for a current key to be inserted into a lookup table, the single current hash value, determined for the current key, indicating a current set of memory locations, in the lookup table, for potential insertion of the current key, wherein the current set of memory locations includes (i) a memory location hashed to by the single current hash value determined for the current key and (ii) one or more other memory locations, wherein respective ones of the one or more other memory locations are hashed to by respective ones of one or more other hash values, different from the current hash value, not determined for the current key; and a table entry manager implemented on one or more integrated circuit devices, the table entry manager configured to
determine that each of the memory locations in the current set of memory locations is occupied by a previously stored key that is currently stored in the lookup table;
in response to determining that each of the memory locations in the current set of memory location is occupied
iteratively move multiple previously stored keys in the lookup table to other memory locations in the lookup table to free up a memory location in the current set of memory locations, and
insert the current key into the freed up memory location in the current set of memory locations; and wherein the network device is configured to perform a lookup operation to locate a key in the lookup table, the key generated based on a network packet received at the network device.

11. The network device of claim 10, wherein the table entry manager is configured to select, in each of multiple iterations of moving previously stored keys, a key among multiple candidate keys to be moved during the iteration.

12. The network device of claim 11, wherein the table entry manager is configured to select the key, among the multiple candidate keys, to be moved during an iteration at least by selecting a key with a highest number of remaining possible memory locations for the key in the lookup hash table.

13. The network device of claim 12, further comprising a memory for storing hash values corresponding to keys stored in the lookup table, and wherein the table entry manager is configured to select the key to be moved during the iteration based on (i) the stored hash value corresponding to the key and (ii) the memory location at which the previously stored key is currently stored in the lookup table.

14. The network device of claim 10, wherein the table entry manager is configured to move a previously stored key during an iteration to a memory location in a set of memory locations associated with a hash value corresponding to the previously stored key.

15. The network device of claim 10, wherein the current set of memory locations further includes multiple memory locations corresponding to the current hash value, and wherein determining whether the current key can be inserted into the lookup hash table includes determining whether the current key can be inserted at any of the multiple memory locations corresponding to the current hash value.

16. The network device of claim 10, wherein the table entry manager is configured to, during an iteration of moving multiple previously stored keys, move a key to a memory location in a set of memory locations that includes a last memory location in the lookup table and an initial memory location in the lookup table.

17. The network device of claim 10, wherein the current set of memory locations includes a plurality of consecutive memory locations in the lookup table.

18. The network device of claim 10, wherein the current set of memory locations includes at least some non-consecutive memory locations in the lookup table.

* * * * *